United States Patent
Widzgowski et al.

(10) Patent No.: US 7,495,236 B2
(45) Date of Patent: Feb. 24, 2009

(54) APPARATUS AND METHOD FOR DETECTION WITH A SCANNING MICROSCOPE

(75) Inventors: Bernd Widzgowski, Dossenheim (DE); Holger Birk, Meckesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/523,109

(22) Filed: Sep. 19, 2006

(65) Prior Publication Data

US 2007/0063153 A1 Mar. 22, 2007

(30) Foreign Application Priority Data

Sep. 21, 2005 (DE) .................. 10 2005 045 163

(51) Int. Cl.
*G01N 21/64* (2006.01)
(52) U.S. Cl. .................................. 250/461.2
(58) Field of Classification Search ............ 250/461.2
See application file for complete search history.

(56) References Cited

U.S. PATENT DOCUMENTS 5,260,572 A * 11/1993 Marshall .............. 250/306
5,283,433 A 2/1994 Tsien
6,037,583 A 3/2000 Moehler et al.
6,914,238 B2 7/2005 Engelhardt et al.
2002/0179828 A1 12/2002 Engelhardt et al.

FOREIGN PATENT DOCUMENTS

| DE | 197 02 752 | 7/1998 |
|----|------------|--------|
| DE | 101 26 286 | 12/2002 |
| DE | 10228478 A1 | 1/2004 |
| EP | 0 845 693 A1 | 3/1998 |
| JP | 2003043369 A | 2/2003 |
| JP | 2004144734 A | 5/2004 |

\* cited by examiner

*Primary Examiner*—David P Porta
*Assistant Examiner*—Marcus H Taningco
(74) *Attorney, Agent, or Firm*—Simpson & Simpson, PLLC

(57) ABSTRACT

An apparatus and a method for detection with a scanning microscope (1) are disclosed. The scanning microscope (1) encompasses a scanning device (7) that guides an illuminating light beam (3) through a scanning optical system (12) and a microscope optical system (13) and over or through a specimen (15). A digital circuit (30), which periodically interrogates the detected signals within a pixel ($P_{x,y}$) and calculates an average therefrom, is placed after the detector unit (19).

30 Claims, 7 Drawing Sheets

APPARATUS AND METHOD FOR DETECTION WITH A SCANNING MICROSCOPE

CROSS REFERENCE TO RELATED APPLICATIONS

This application claims priority of the German patent application DE 10 2005 045 163.2 filed Sep. 21, 2005.

FIELD OF THE INVENTION

The present invention relates generally to the field of scanning microscopes, more specifically to the field of detection of fluorescent or luminescent light and still more particularly to the measurement of light from multiple pixels on a sample grid.

BACKGROUND OF THE INVENTION

German Unexamined Application DE 101 26 286 A1 to Engelhardt, et al. discloses a method and an apparatus for point-by-point scanning of a sample. The method is characterized by the steps of generating a setpoint signal for each scan point and transferring the setpoint signal to a scanning device. In further steps, an actual signal is ascertained for each scanned point from the position of the scanning device. Also performed are detection of at least one detected signal for each scanned point, calculation of a display signal and an image position from the actual signal and/or the setpoint signal and the detected signal, and allocation of the display signal to the image point position. It is problematic that conventionally, deflection of the mirror galvanometer proceeds, for example, sinusoidally, i.e. the deflection changes more slowly in the vicinity of the reversing points (corresponding to the image edges) than at the zero transition. This nonlinearity results in a different illumination time or cycle time $T_i$ for each pixel (see FIG. 4). Conventionally, the signals generated by the detector are integrated, using an integrator constructed with analog technology, over a constant maximum time suitable for all pixels. The data value is then read out by an analog-digital converter, and the integrator is cleared. Only then does a new cycle begin for the next pixel. It is disadvantageous here that the integration time is based on the pixels having the shortest illumination time or cycle time. Valuable measurement time is thus lost for the pixels at the image edges (scan direction reversal) having longer cycle times, i.e. the signal-to-noise ratio there is degraded.

Unexamined Application DE 197 02 752 A1 to Schoppe, et al. discloses a triggering system for a scanner drive. The scanner is driven by an oscillating motor, so that a scanning mirror oscillates. A triggering unit provides linear feed of a suitable control frequency to the oscillating motor, so that the scanning beam also describes a substantially linear path on the surface of the sample.

European Patent Application EP 0 845 693 to Hakozaki encompasses a confocal microscope and a method for generating a three-dimensional image with a confocal microscope. A device is provided that generates a relative motion in the direction of the optical axis. Also provided is a control unit that simultaneously controls or regulates the device for generating the relative motion and a scanning device.

Further disadvantages of the existing art are that an input signal cannot be detected during the necessary clearing time of an analog integrator. At high scanning rates, however, the clearing time can constitute more than half the cycle time. At 8 kHz (resonant scan), for example, the integration time per pixel can be 25 ns. Clearing of the integrated signal (for short integration times), on the other hand, can take at least 20 ns. Because a high scanning speed is required, however, it is no longer possible to completely clear the integrator. For this reason as well, the integration time (and thus also the cycle time) must be constant within a line that is to be scanned. The final integration value, and thus also the subjective image brightness, is thus dependent on the scanning speed and the scan format. The image settings must be correspondingly corrected by the user.

SUMMARY OF THE INVENTION

The present invention relates to an apparatus for detection with a scanning microscope. The invention relates in particular to an apparatus for detection with a scanning microscope, the scanning microscope possessing a scanning device that guides an illuminating light beam through a scanning optical system and a microscope optical system and over or through a specimen, the illuminating light beam illuminating the specimen in multiple pixels; and possessing a detector unit that receives the light emanating from the specimen and generates detected signals.

The invention further relates to a method for detection with a scanning microscope. The invention relates in particular to a method for detection with a scanning microscope, the scanning microscope possessing a scanning device that guides an illuminating light beam through a scanning optical system and a microscope optical system and over or through a specimen, the specimen being illuminated in multiple pixels with the illuminating light beam, and the light emanating from the specimen being received with a detector unit, and detected signals being generated.

It is the object of the present invention to create an apparatus with which image quality is improved, thus resulting in a balanced image brightness, which is independent of the format used and of the scanning speed, in the acquired image.

It is the object of the present invention to create a method with which image quality is improved, thus resulting in a balanced image brightness, which is independent of the format used and of the scanning speed, in the acquired image.

The stated object is achieved by a method that exhibits the features of Claim 1.

According to the present invention, there is placed after the detector unit a digital circuit that periodically interrogates (accesses and measures) the detected signals within a pixel and calculates an average therefrom. It is additionally advantageous that the detected signals of the detector unit are periodically interrogated and summed by means of a digital circuit, and that the sum of the detected signals is divided by the number of summed detected signals.

At the beginning of a new cycle, the summing element is set to equal the first scanned value of that cycle. This advantageously eliminates a clearing operation.

This digital integration is carried out at the maximum duty cycle. Because of the real-time division by the actual integration time, the signal-to-noise ratio at the image edge is substantially improved as compared with a fixed integration time for the entire image.

A further advantage is that the digital circuit contains a summing element that periodically sums the multiple detected signals within a pixel; and that the digital circuit contains a dividing element that divides the sum of the multiple detected signals by a number of detected signals within the respective pixel.

A multiplying element is placed before the summing element and dividing element in the digital circuit (30), that is the multiplying element receives and processes the signal before it is transmitted to the summing element and the dividing element.

The multiplying element carries out an amplification of the detected signals, thereby increasing the numerical precision of the summing element and the dividing element.

The scanning microscope is equipped with an adjusting element for the gain, thus producing a combination of the digital and the analog amplification of the digital circuit and the detector unit.

The nonlinearity of the analog amplification of the detector unit can be compensated for by corresponding storage of a characteristic curve in the digital circuit. The detector unit thus possesses a characteristic curve that, by means of the amplification in the digital circuit, achieves an elevation of the dynamics of the sensitivity of the detector unit.

Further advantageous embodiments of the invention may be inferred from the dependent claims.

BRIEF DESCRIPTION OF THE DRAWINGS

The subject matter of the invention is schematically depicted in the drawings and will be described below with reference to the Figures, in which.

DETAILED DESCRIPTION OF THE INVENTION

Figure 1:
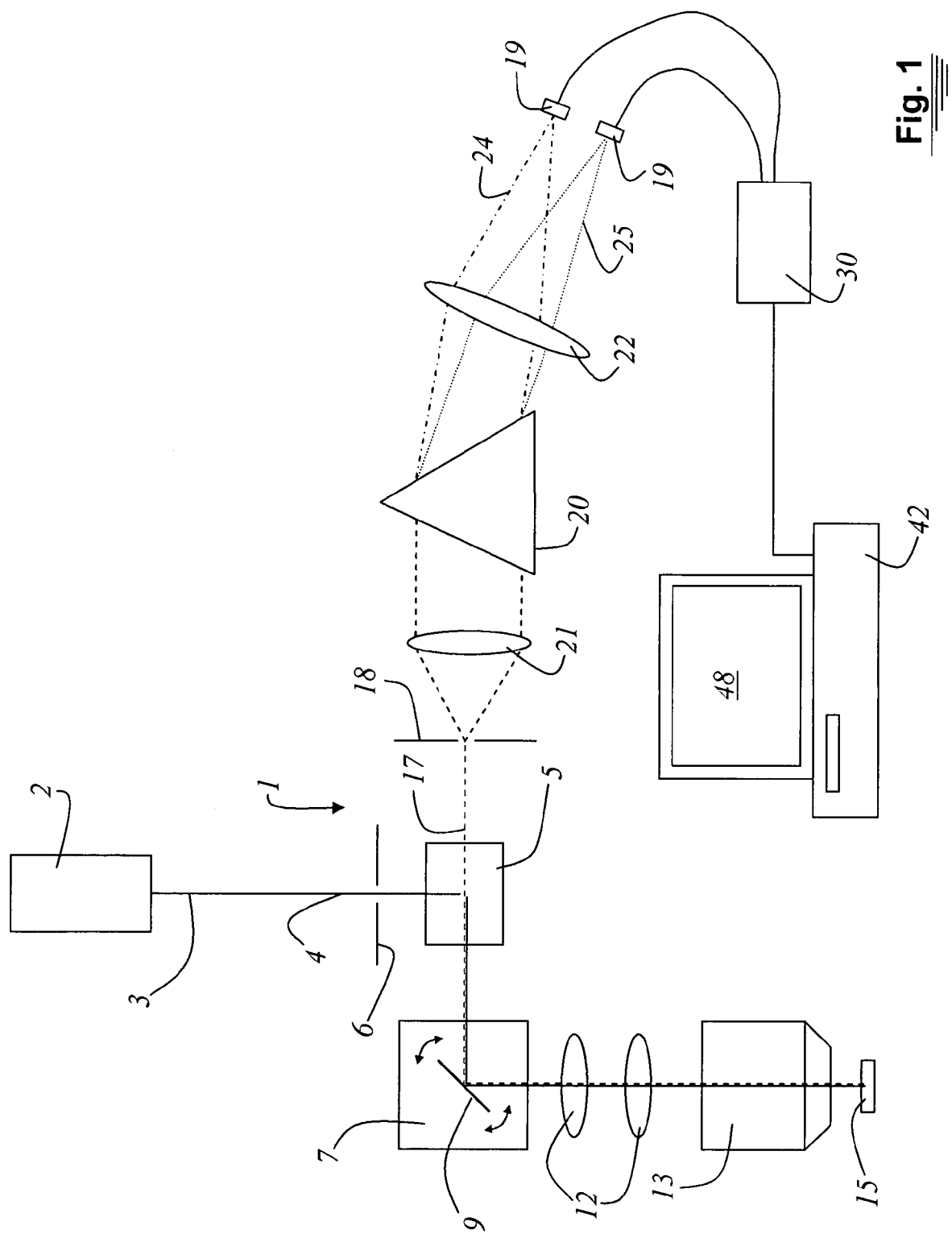
FIG. 1 schematically depicts a scanning microscope having a detection unit and a digital circuit for evaluation of the detected signals.

FIG. 1 shows the schematic configuration of a confocal scanning microscope 1 in which the apparatus according to the present invention is implemented. The scanning microscope encompasses a detector unit 19 that can be embodied in a variety of forms. Illuminating light beam 3 coming from at least one illumination system 2 is directed, by a beam splitter or a suitable deflection means B, to a scanning device 7. Before illuminating light beam 3 encounters deflection means 5, it passes through an illumination pinhole 6. Scanning device 7 encompasses at least one scanning mirror 9 that guides illuminating light beam 3 through a scanning optical system 12 and a microscope optical system 13 and over or through a specimen 15. Scanning mirror 9 can be driven by a motor (not depicted), a torsion rod additionally being provided with which scanning mirror 9 is also operable as a resonant scanning mirror 9. In the case of non-transparent specimens 15, illuminating light beam 3 is guided over the specimen surface. In the case of biological specimens 15 (preparations) or transparent specimens, illuminating light beam 3 can also be guided through specimen 15. For these purposes, non-luminous preparations are prepared as applicable with a suitable dye (not depicted because it is established art). The dyes present in specimen 15 are excited by illuminating light beam 3 and emit luminescent and/or fluorescent light in a characteristic region of the spectrum specific to them. This light emanating from specimen 15 defines a detected light beam 17. The latter travels through microscope optical system 13 and scanning optical system 12 and via scanning module 7 to deflection means 5, traverses the latter, and travels via a detection pinhole 18 and spectrum-generating element 20 (prism or grating) onto detector unit 19. Detector unit 19 can be made up of at least one photomultiplier. It is likewise conceivable for detector unit 19 to be made up of a photomultiplier array or a CCD chip, an EMCCD chip, or an APD array. Detected light beam 17 emanating from or defined by specimen 15 is depicted in FIG. 1 as a dashed line. Electrical detected signals proportional to the power level of the light emanating from specimen 15 are generated in detector unit 19. Because, as already mentioned above, light of not only one wavelength is emitted from specimen 15, it is useful to provide a dispersive element 20 in front of detector unit 19. Dispersive element 20 spectrally divides the detected light beam so that the individual wavelengths of the detected light are spatially spectrally separated. Placed in front of dispersive element 20 is a lens 21 that spreads detected light beam 17 and makes it parallel. Placed after dispersive element 20 is a further lens 22 that focuses spectrally separated beams 24, 25 of detected light beam 17 onto detector unit 19. Spectrally separated beams 24, 25 differ in terms of wavelength, and thus strike different photomultipliers or, if detector 19 is configured as a chip, different regions of the chips. The signals furnished by detector unit 19 are conveyed to a digital circuit 30 in which collection of the detector signals takes place. Digital circuit 30 can furthermore be connected to a computer 42, associated with which is a display 48 on which, for example, the image data can be displayed.

Figure 2A:
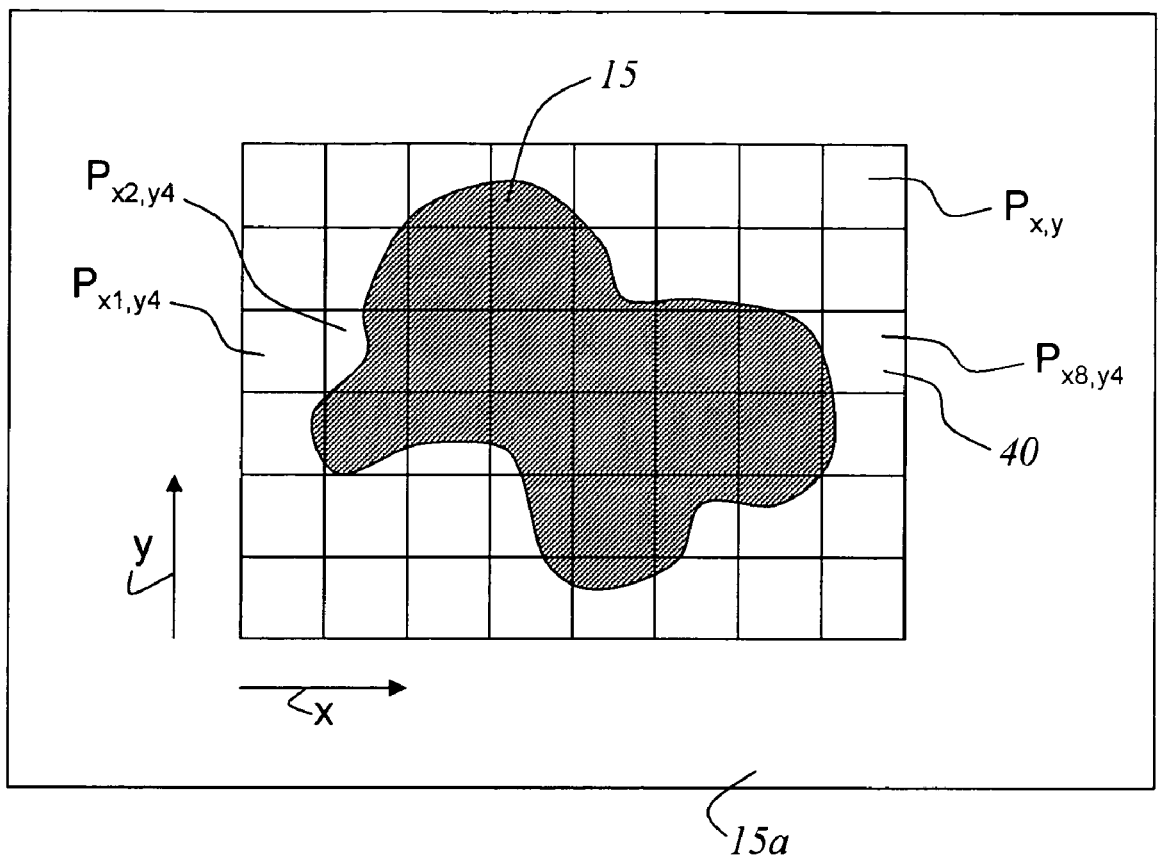
FIG. 2a is a schematic view of the procedure with which a specimen to be examined is scanned pixel-by-pixel using a first pixel size.
Figure 4:
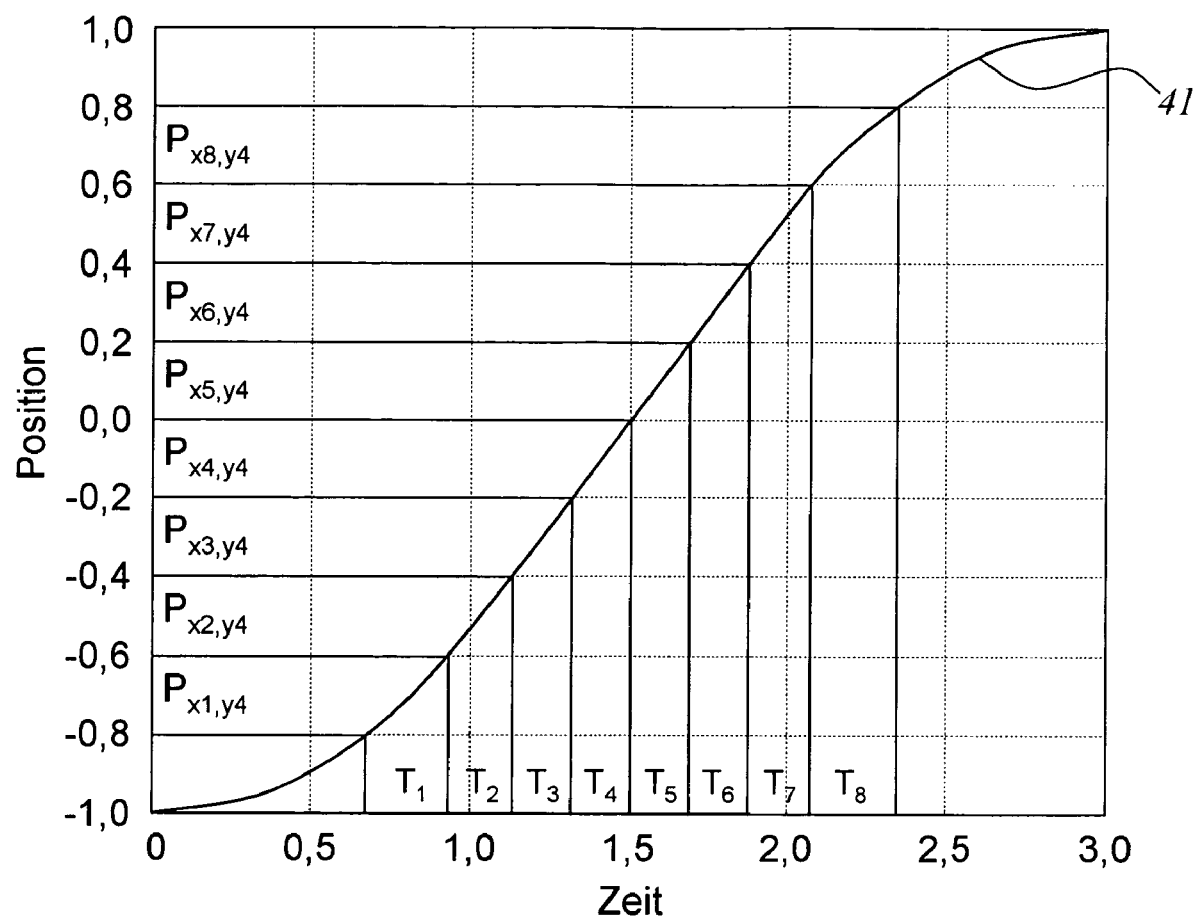
FIG. 4 graphically depicts the different sampling times for pixels of uniform size.

FIG. 2a is a schematic view of the procedure with which a specimen 15 to be examined is scanned pixel-by-pixel using a first pixel size. Specimen 15 is usually mounted on a specimen slide 15a. Specimen 15 is scanned in X coordinate direction x and in Y coordinate direction y with illuminating light beam 3, utilizing scanning device 7. It is also possible for only portions of specimen 15 to be scanned. The size of each individual pixel $P_{x,y}$ is based on the setting selected by the user. The size of individual pixel $P_{x,y}$ is selected depending on the desired resolution. The signals initiated by illuminating light beam 3 are acquired from the region that is determined by the size of an individual pixel $P_{x,y}$. Scan line 40 depicted in FIG. 2a, which is made up of pixels $P_{x1,y4}$, $P_{x2,y4}$ to $P_{x8,y4}$, results from the scanning motion of scanning mirror 9 in X coordinate direction x. FIG. 4 shows sinusoidal profile 41 of the scanning motion of scanning mirror 9. It is self-evident that the number of pixels $P_{x,y}$ in scan line 40 is arbitrary, and the embodiments presented in the Description cannot be construed as a limitation of the invention.

Figure 2B:
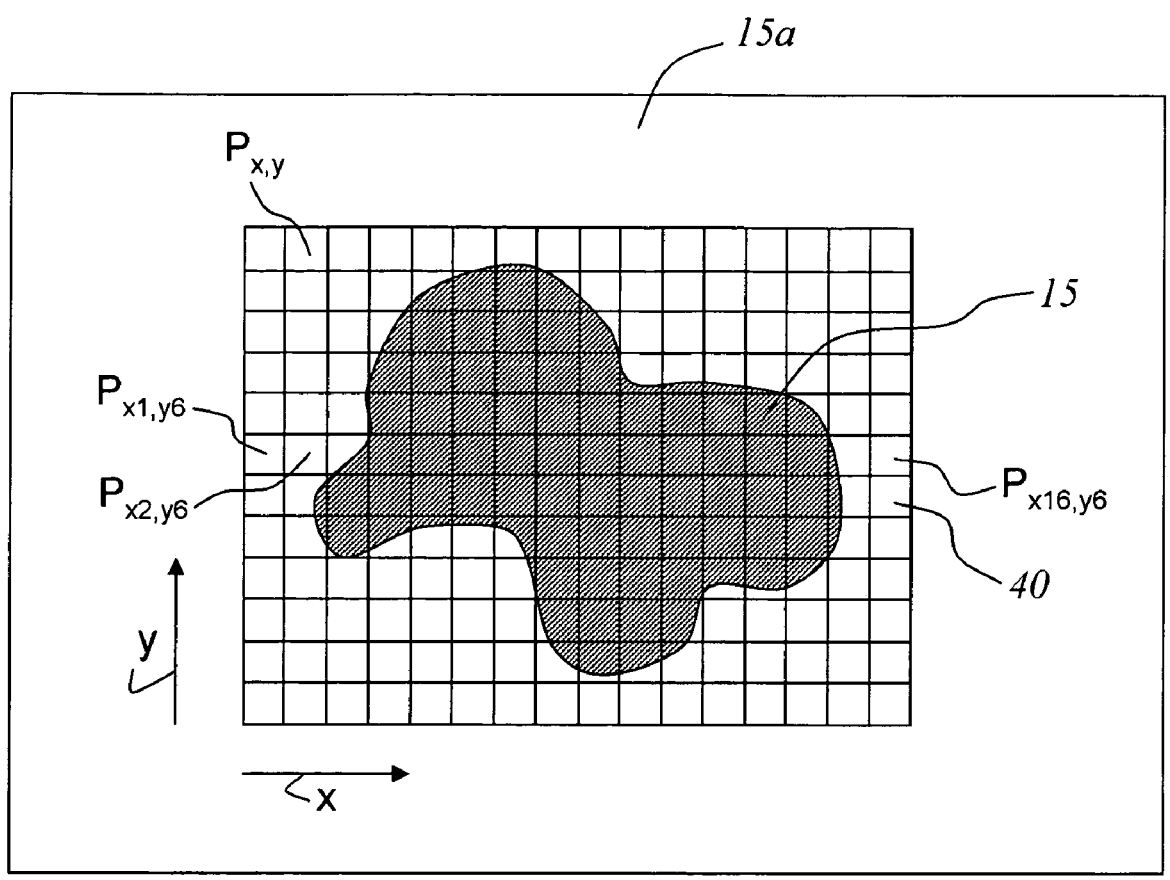
FIG. 2b is a schematic view of the procedure with which a specimen to be examined is scanned pixel-by-pixel using a second pixel size.

FIG. 2b is a schematic view of the procedure with which a specimen 15 to be examined is scanned pixel-by-pixel using a second pixel size. Here illuminating light beam 3 describes a scan line 40 that is constructed from more pixels $P_{x,y}$ than in the case of scan line 40 depicted in FIG. 2a. Scan line 40 depicted in FIG. 2b, which is made up of pixels $P_{x1,y6}$, $P_{x2,y6}$ to $P_{x16,y6}$, results from the scanning motion of scanning mirror 9 in X coordinate direction x.

Figure 3:
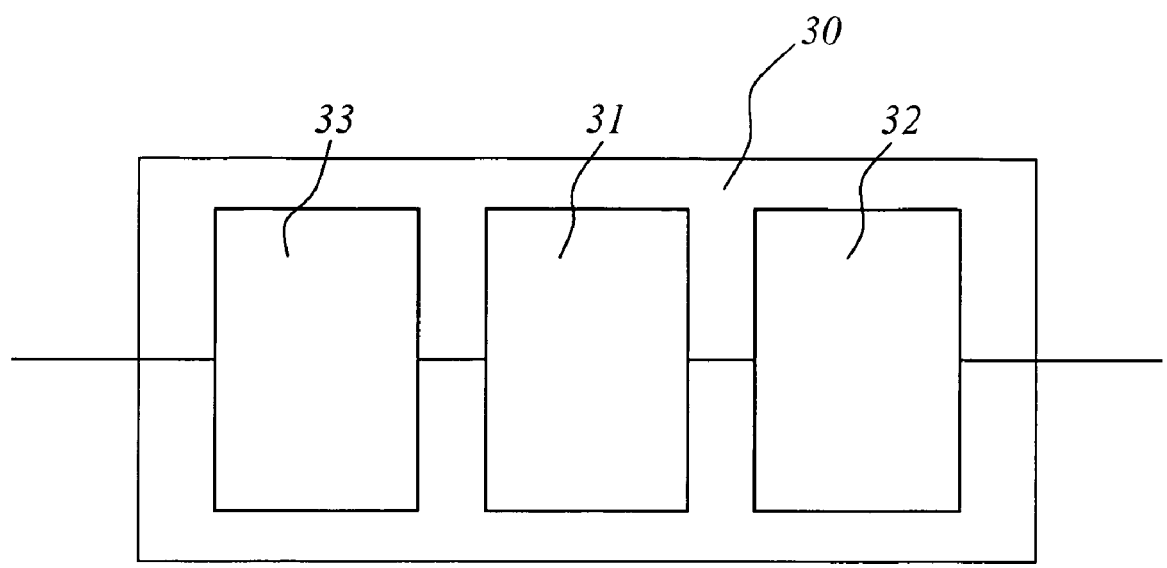
FIG. 3 is a schematic view of the construction of the digital circuit.

FIG. 3 is a schematic view of the construction of digital circuit 30. Digital circuit 30 is placed after detector unit 19 (see FIG. 1), which circuit periodically interrogates the detected signals within a pixel $P_{x,y}$ and calculates an average therefrom. Digital circuit 30 contains a summing element 31 that sums the multiple periodic detected signals within a pixel $P_{x,y}$. Digital circuit 30 furthermore contains a dividing element 32 that divides the sum of the multiple detected signals by a number of detected signals that were summed within the respective pixel $P_{x,y}$. In a further embodiment of the invention, a multiplying element 33 is placed before summing element 31 and divider 32 in digital circuit 30. By means of a digital multiplication (before summing element 31 and the following dividing element 32) it is also possible to achieve a signal amplification, thereby increasing the numerical precision. As a result of the averaging, the output value of detector unit 19, and thus the image brightness, is independent of the scanning speed and scan format. The averaging furthermore decreases the noise in the output data and also minimizes digitization errors ("outliers"). Interfering effects such as, for example, parameter drift of the analog components (due to temperature, aging, component tolerances) are decreased or eliminated as a result of the digitization.

FIG. 4 is a graphic depiction of the different sampling times $T_1$, $T_2$ to $T_8$ for pixels $P_{x1,y4}$, $P_{x2,y4}$ to $P_{x8,y4}$ of uniform size. The number of pixels per scan line 40 corresponds to the number depicted in FIG. 2a. The approximately sinusoidal profile 41 is governed by the control applied to the at least one scanning mirror 9. Within the different sampling times $T_1$, $T_2$, or $T_8$, a certain number of detected signals for each pixel $P_{x,y}$ are periodically interrogated and summed by detector unit 19 by means of a digital circuit 30. The number of detected signals interrogated is based on the clock frequency that is set. It is clearly evident from FIG. 4 that the individual pixels $P_{x,y}$ adjoin one another with no interstices, so that no information from specimen 15 is lost. An optimum measuring time for each pixel $P_{x,y}$, as compared with analog integration, is also guaranteed, resulting from the elimination of the clearing time of an analog integrator. No time losses occur due to clearing of the summing/integrating element or waiting times because of the timing cycle. The invention moreover makes possible a variable cycle time as a function of the speed at which the scanning point or illuminating light beam 3 moves over specimen 15. The cycle time is unrestrictedly selectable. It can be selected to match the instantaneous speed of the scanning spot on specimen 15.

Figure 5:
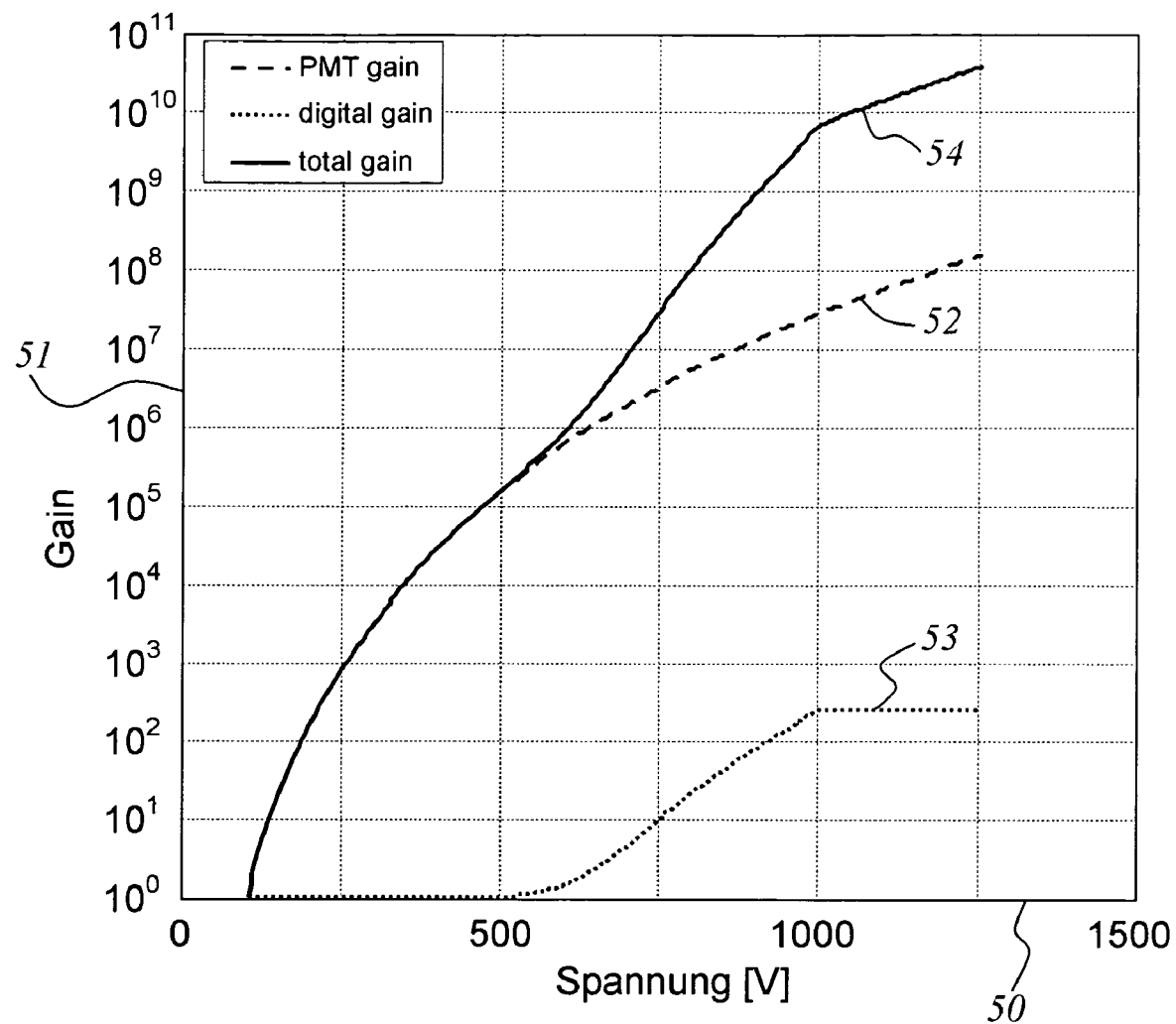
FIG. 5 graphically depicts the voltage at the detector unit as a function of the resulting gain.

FIG. 5 is a graphic depiction of the voltage at detector unit 19 as a function of the resulting gain. The voltage (in volts) is plotted on abscissa 50, and the gain on ordinate 51. Detector unit 19 is in this case a photomultiplier, and the gain of the photomultiplier (analog amplification) as a function of voltage is depicted as a dashed curve 52. The gain achieved by way of multiplying element 33 in the digital circuit (digital amplification) is depicted as a dotted curve 53. The sum of the analog amplification and digital amplification is depicted as a solid-line curve 54. Equalization of the nonlinear analog amplification as a function of the voltage at the photomultiplier is accomplished by corresponding compensation upon digital amplification in digital circuit 30. Optionally, a different gain behavior can also be set. With the method proposed here, it is possible to operate the photomultiplier or photomultipliers at the optimum working point over a larger detection range. The optimum working point is between 500V and 1000V. A nonlinear characteristic curve can also be used to elevate the dynamics, since the sensitivity of detector unit 19 depends on the level of the detected signal.

Figure 6:
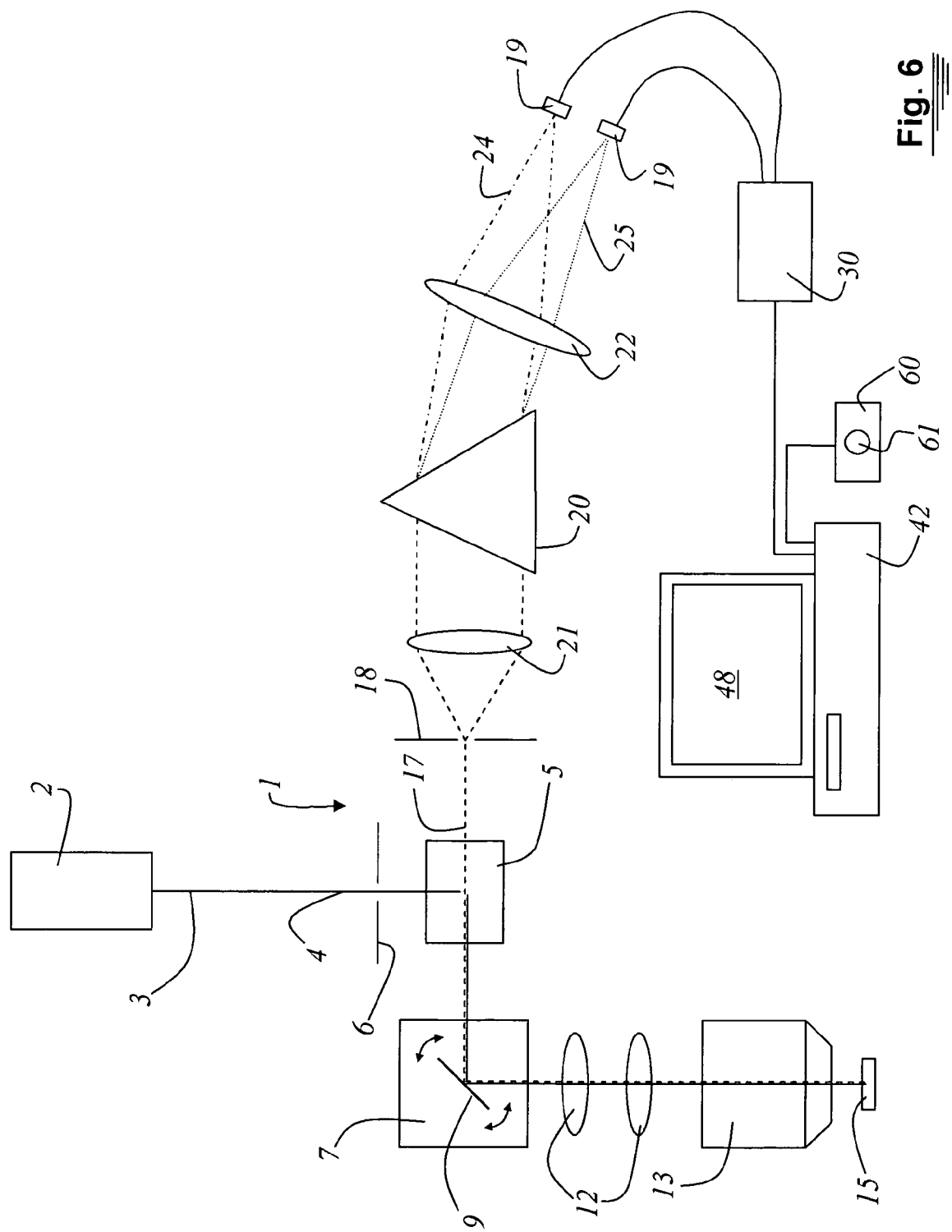
FIG. 6 schematically depicts a scanning microscope having a detection unit and a digital circuit for evaluation of the detected signals, and having an adjusting element for the amplification.

FIG. 6 schematically depicts a scanning microscope 1 having at least one detection unit 19 and a digital circuit 30 for evaluating the detected signals. Also provided is an adjusting element 60 with which the gain or amplification can be adjusted by the user. It is likewise conceivable to depict adjusting element 60 for the user on display 48 of computer 42. A suitable combination of digital and analog amplification for digital circuit 30 and detection 19 exists when both amplifications are varied simultaneously. For the user, however, there is only one gain knob 61 on adjusting element 60. Separate adjustment of the digital and the analog amplification is likewise conceivable. Two adjusting elements (not depicted) are consequently required for this.

We claim:

1. A method for detection with a scanning microscope, the scanning microscope comprising a scanning device (7) that guides an illuminating light beam (3) through a scanning optical system (12) and a microscope optical system (13) and over or through a specimen (15), the specimen (15) being illuminated in multiple pixels ($P_{x,y}$) with the illuminating light beam (3), and the light emanating from the specimen (15) being received with a detector unit (19), and detected signals being generated, wherein the scanning microscope further comprises a digital circuit comprising a summing element and a dividing element, the method comprising the following steps:
  interrogating a detected signal of the detector unit (19) by means of said digital circuit;
  summing the detected signal of the detector unit (19) by means of said summing element resulting in a sum of detected signals;
  repeating said steps of interrogating and summing for a number of detected signals, wherein said number of detected signals defines in a cycle;
  dividing the sum of detected signals by the number of detected signals by means of said dividing element resulting in an average detected signal;
  interrogating a detected signal of the detector unit (19) by means of said digital circuit;
  setting said summing element equal to said detected signal of the detector unit (19); and,
  repeating the steps above.

2. The method according to claim 1, wherein a multiplying element is placed before the summing element and dividing element in the digital circuit.

3. The method according to claim 2, wherein an amplification of the detected signals is carried out with the multiplying element, thereby increasing the numerical precision of the summing element and the dividing element.

4. The method according to claim 3, wherein the scanning microscope (1) is a laser scanning microscope.

5. The method according to one of claims 2, wherein the scanning microscope is equipped with an adjusting element for the gain, so that a digital amplification of the digital circuit and an analog amplification of the digital circuit (19) are combined.

6. The method according to claim 5, wherein the scanning microscope (1) is a laser scanning microscope.

7. The method according to claim 2, wherein the scanning microscope (1) is a laser scanning microscope.

8. The method according to one of claims 1, wherein the scanning microscope is equipped with an adjusting element for the gain, so that a digital amplification of the digital circuit and an analog amplification of the digital circuit (19) are combined.

9. The method according to claim 8, wherein the analog amplification of the detector unit (19) is compensated for by corresponding multiplication in the digital circuit.

10. The method according to claim 9, wherein the detector unit (19) possesses a characteristic curve whose dynamics are elevated by means of the amplification in the digital circuit.

11. The method according to claim 10, wherein the scanning microscope (1) is a laser scanning microscope.

12. The method according to claim 9 wherein the scanning microscope (1) is a laser scanning microscope.

13. The method according to claim 8, wherein the scanning microscope (1) is a laser scanning microscope.

14. The method according to one of claims 1, wherein the scanning microscope is equipped with an adjusting element for the gain, so that a digital amplification of the digital circuit and an analog amplification of the digital circuit (19) are combined.

15. The method according to one of claims 3, wherein the scanning microscope is equipped with an adjusting element for the gain, so that a digital amplification of the digital circuit and an analog amplification of the digital circuit (19) are combined.

16. The method according to claim 15, wherein the analog amplification of the detector unit (19) is compensated for by corresponding multiplication in the digital circuit.

17. The method according to claim 16, wherein the detector unit (19) possesses a characteristic curve whose dynamics are elevated by means of the amplification in the digital circuit.

18. The method according to claim 17, wherein the scanning microscope (1) is a laser scanning microscope.

19. The method according to claim 15, wherein the scanning microscope (1) is a laser scanning microscope.

20. The method according to claim 16, wherein the scanning microscope (1) is a laser scanning microscope.

21. The method according to claim 14, wherein the analog amplification of the detector unit (19) is compensated for by corresponding multiplication in the digital circuit.

22. The method according to claim 21, wherein the detector unit (19) possesses a characteristic curve whose dynamics are elevated by means of the amplification in the digital circuit.

23. The method according to claim 22, wherein the scanning microscope (1) is a laser scanning microscope.

24. The method according to claim 21, wherein the scanning microscope (1) is a laser scanning microscope.

25. The method according to claim 14, wherein the scanning microscope (1) is a laser scanning microscope.

26. The method according to claim 5, wherein the analog amplification of the detector unit (19) is compensated for by corresponding multiplication in the digital circuit.

27. The method according to claim 26, wherein the detector unit (19) possesses a characteristic curve whose dynamics are elevated by means of the amplification in the digital circuit.

28. The method according to claim 27, wherein the scanning microscope (1) is a laser scanning microscope.

29. The method according to claim 26, wherein the scanning microscope (1) is a laser scanning microscope.

30. The method according to claim 1, wherein the scanning microscope (1) is a laser scanning microscope.

* * * * *